United States Patent
Blum et al.

(10) Patent No.: US 9,529,201 B1
(45) Date of Patent: *Dec. 27, 2016

(54) MAGNETICALLY COUPLED WATERPROOF HINGE WITH INTEGRATED MULTI-STAGE BUTTON AND STATE DETECTION

(71) Applicant: Google Inc., Mountain View, CA (US)

(72) Inventors: Jeremy Evan Blum, San Francisco, CA (US); Peter Michael Cazalet, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,356

(22) Filed: Feb. 8, 2016

Related U.S. Application Data

(63) Continuation of application No. 14/298,398, filed on Jun. 6, 2014, now Pat. No. 9,294,739.

(51) Int. Cl.
*G01B 7/14* (2006.01)
*G02B 27/01* (2006.01)
*H04N 5/232* (2006.01)
*H01H 9/04* (2006.01)

(52) U.S. Cl.
CPC ............ *G02B 27/0176* (2013.01); *G01B 7/14* (2013.01); *H01H 9/04* (2013.01); *H04N 5/232* (2013.01); *G02B 2027/0178* (2013.01)

(58) Field of Classification Search
CPC .................... H04N 13/0429; H04N 2213/008; H04N 7/188; H04N 5/2251; H04N 5/2252; H04N 13/0484; H04N 5/225; A63F 13/53; A63F 2300/303; B60R 2300/205; B60R 2300/308; G01C 21/365; G02B 27/01; G02B 13/001; G02B 27/0172; G02B 27/0176; G02B 2027/0178; G08G 5/0017; G09B 9/307; G08B 13/19621; H04M 2250/20; G03B 17/561; G03B 17/566; G03B 17/568; G03B 17/02; G01B 7/14; G05B 2219/35503; G06F 3/013
See application file for complete search history.

(56) References Cited

U.S. PATENT DOCUMENTS

| | | | |
|---|---|---|---|
| 6,680,802 | B1 | 1/2004 | Ichikawa et al. |
| 7,542,012 | B2 | 6/2009 | Kato et al. |
| 8,040,292 | B2 | 10/2011 | Ronzani et al. |
| 8,378,924 | B2 | 2/2013 | Jacobsen et al. |

(Continued)

FOREIGN PATENT DOCUMENTS

EP    1202104 A1    5/2002

*Primary Examiner* — Aung S Moe
(74) *Attorney, Agent, or Firm* — Lerner, David, Littenberg, Krumholz & Mentlik, LLP

(57) ABSTRACT

An example of a waterproof hinge and button configuration for a head mounted device is provided. A magnet may be attached to the button, and a sensor may be positioned adjacent to the button to detect movement of the button. For example, the sensor may detect when the button is fully pressed, partially pressed, or not pressed at all by the level of magnetic flux density detected by the sensor. In addition, the sensor may detect an opened or closed position of the hinge based on the magnetic field polarity of the magnet. Due to the implementation of the sensor, the electrical components of the button are able to be removed so as to make the button-hinge configuration waterproof.

20 Claims, 10 Drawing Sheets

(56) References Cited

U.S. PATENT DOCUMENTS

| | | | |
|---|---|---|---|
| 8,866,702 B1 | 10/2014 | Wong et al. | |
| 9,075,249 B2 * | 7/2015 | Heinrich | G02C 11/10 |
| 9,091,852 B2 | 7/2015 | Olsson et al. | |
| 9,094,677 B1 | 7/2015 | Mendis et al. | |
| D737,272 S | 8/2015 | Olsson et al. | |
| 9,128,284 B2 | 9/2015 | Cazalet | |
| 9,146,618 B2 * | 9/2015 | Tait | G06F 3/017 |
| 9,164,284 B2 | 10/2015 | Olsson et al. | |
| 9,294,739 B1 * | 3/2016 | Blum | H04N 7/188 |
| 2002/0118506 A1 | 8/2002 | Saito | |
| 2002/0149545 A1 | 10/2002 | Hanayama et al. | |
| 2006/0018027 A1 | 1/2006 | Yamasaki | |
| 2006/0238878 A1 | 10/2006 | Miyake et al. | |
| 2008/0198324 A1 * | 8/2008 | Fuziak | G02B 27/0172 351/158 |
| 2010/0073262 A1 | 3/2010 | Matsumoto | |
| 2010/0246022 A1 | 9/2010 | Matsumoto et al. | |
| 2011/0012814 A1 | 1/2011 | Tanaka | |
| 2011/0231757 A1 | 9/2011 | Haddick et al. | |
| 2012/0188148 A1 * | 7/2012 | DeJong | G02B 27/0093 345/8 |
| 2012/0188149 A1 | 7/2012 | Yamada | |
| 2013/0188080 A1 | 7/2013 | Olsson et al. | |
| 2013/0235331 A1 | 9/2013 | Heinrich et al. | |
| 2013/0250503 A1 | 9/2013 | Olsson et al. | |
| 2014/0345090 A1 | 11/2014 | Wang | |
| 2015/0261015 A1 | 9/2015 | Han et al. | |

* cited by examiner

400

| Voltage Received | 25 % | 50 % | 90% |
|---|---|---|---|
| Actions | Initialize the graphics pipeline in the background | Display a preview image to the user | Capture a photo |

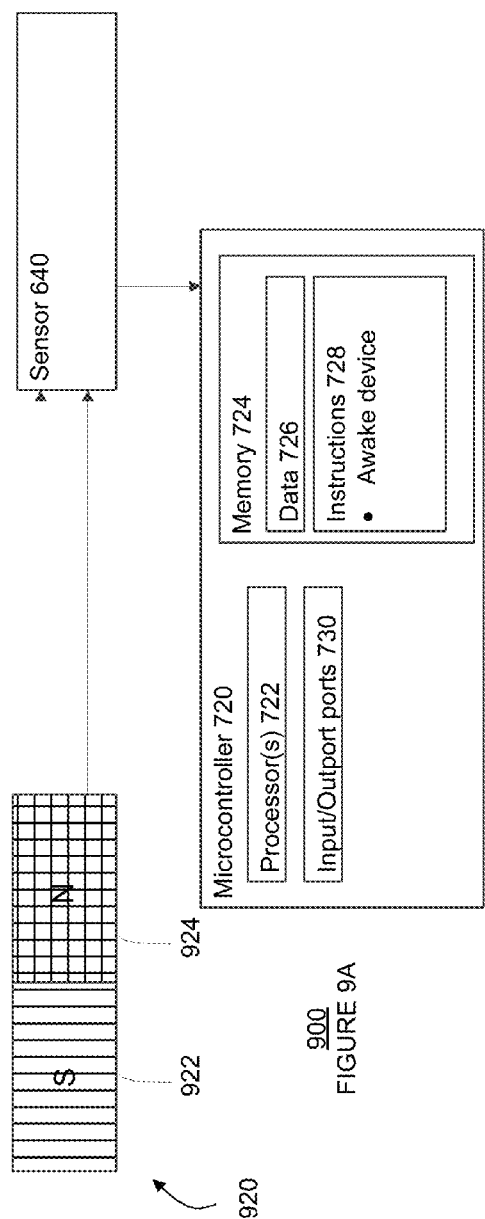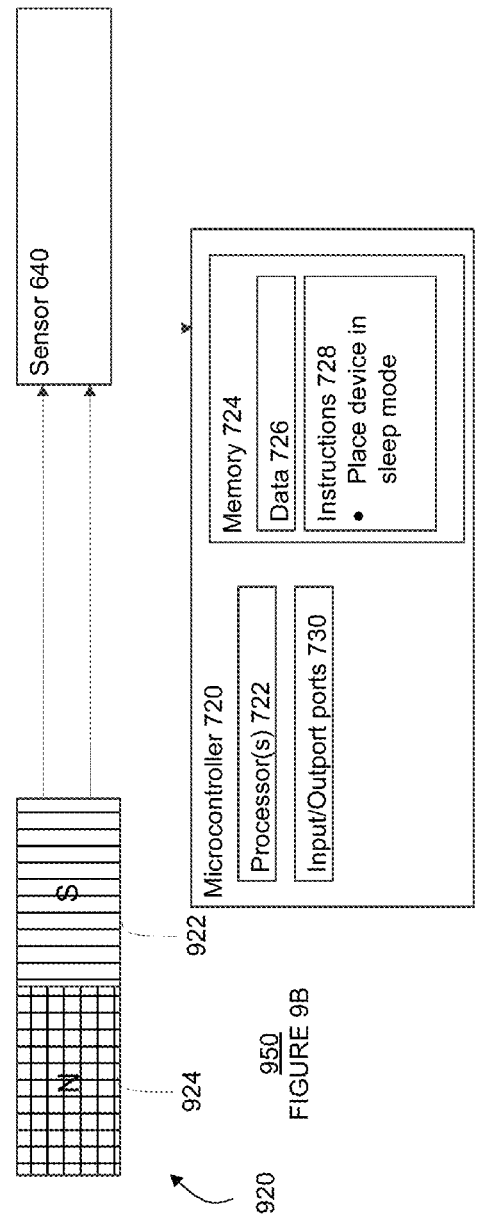

MAGNETICALLY COUPLED WATERPROOF HINGE WITH INTEGRATED MULTI-STAGE BUTTON AND STATE DETECTION

CROSS-REFERENCES TO RELATED APPLICATIONS

The present application is a continuation of U.S. patent application Ser. No. 14/298,398, filed on Jun. 6, 2014, the disclosure of which is incorporated herein by reference.

BACKGROUND

As wearable electronic devices become more popular, improvements continue to be made in order to make these devices adaptable to various environmental conditions and situations. For example, unlike cellphones, which tend to be protected in a user's pocket, wearable electronic devices, such as a watch or a head mounted device, may be constantly exposed to the environment. As such, wearable electronic devices may be more prone to damage from external forces, such as rain, dropping on the floor, and banging up against hard-objects, such as a wall, table, etc.

SUMMARY

A waterproof button and hinge configuration is provided for a wearable electronic device, while still maintaining the aesthetic and functional qualities of the wearable device. A sensor positioned in relation to the button and hinge is configured to interact with a magnet associated with the button and hinge to detect movement thereof and communicate the detected movement to a microcontroller or processor of the wearable device. Accordingly, an enclosed magnet is used to convey user intent to a sensor, thus eliminating the need for electronics or wiring inside critical mechanical waterproof areas of a wearable device.

A system, method, and apparatus are provided for the waterproof button and hinge configuration of a head mounted device. In accordance with one embodiment, a side arm comprised of a first piece and a second piece, the first piece adjacent to a center support of the apparatus and the second piece adjacent to the first piece; a hinge positioned between the first and second pieces, the hinge adapted to act as a pivot point in moving the second piece of the side arm with respect to the first piece; a button positioned on the hinge; a magnet positioned within the hinge in relation to the button; and a sensor positioned on the side arm and adjacent to the button, wherein the sensor is configured to detect magnetic flux density from the magnet.

In one example, an outer housing of the first and second pieces of the side arm is comprised of non-porous material. In that example, electrical circuitry is placed inside the second piece of the side arm. As another example, the sensor is located on the second piece of the side arm. According to another example, the sensor is positioned in a first orientation with respect to the magnet when the hinge is in an open position. As another example, the sensor is positioned in a second orientation with respect to the magnet when the hinge is in a closed position. In another example, the button is at least partially encapsulated in a button housing, and the button housing is configured to protect internal components of the button from damage. As another example, the button is moving among a plurality of positions, the plurality of positions at least including being fully pressed, half-pressed, and not pressed. In that example, the magnet is configured to move with the movement of the button.

In accordance with another embodiment, a method includes measuring, using a sensor coupled to at least one processor, at least one of magnetic field polarity and magnetic flux density of a magnet positioned within a button and hinge configuration; generating, using the at least one processor, a value based on the measurement, wherein the value indicates at least one of a distance between the sensor and the magnet and an orientation of the sensor with respect to the magnet; determining whether the value satisfies one of a plurality of threshold levels, each threshold level being associated with a different function; and performing the function associated with the satisfied threshold level.

In another example, the method also includes determining, based on the value, a position of the button and hinge configuration. In that example, the position corresponds to a level of depression of the button. As another example, the function includes at least one of capturing an image using a camera, previewing an image using the camera, and initializing operation of the camera. In another example, the function includes at least one of waking-up an electronic device or placing the electronic device in a sleep-mode. As another example, the method includes powering off the sensor for periods of time.

According to another embodiment, a system includes a sensor; one or more processors in communication with the sensor; memory coupled to the one or more processors; wherein the one or more processors are configured to: receive from the sensor a measurement of at least one of magnetic field polarity and magnetic flux density of a magnet positioned within a button and hinge configuration; generate a value based on the measurement, wherein the value indicates at least one of a distance between the sensor and the magnet and an orientation of the sensor with respect to the magnet; determine whether the value satisfies one of a plurality of threshold levels, each threshold level being associated with a different function; and perform the function associated with the satisfied threshold level. According to another example, the one or more processors are further configured to determine, based on the value, a position of the button and hinge configuration. In that example, the position corresponds to a level of depression of the button. In another example, the function includes at least one of capturing an image using a camera, previewing an image using the camera, and initializing operation of the camera. In another example, the function includes at least one of waking-up an electronic device or placing the electronic device in a sleep-mode.

BRIEF DESCRIPTION OF THE DRAWINGS

FIG. 8 is a table illustrating exemplary functions of the button in accordance with aspects of the disclosure.

FIGS. 9A-B are examples of the hinge detection feature in accordance with aspects of the disclosure.

DETAILED DESCRIPTION

Figure 1:
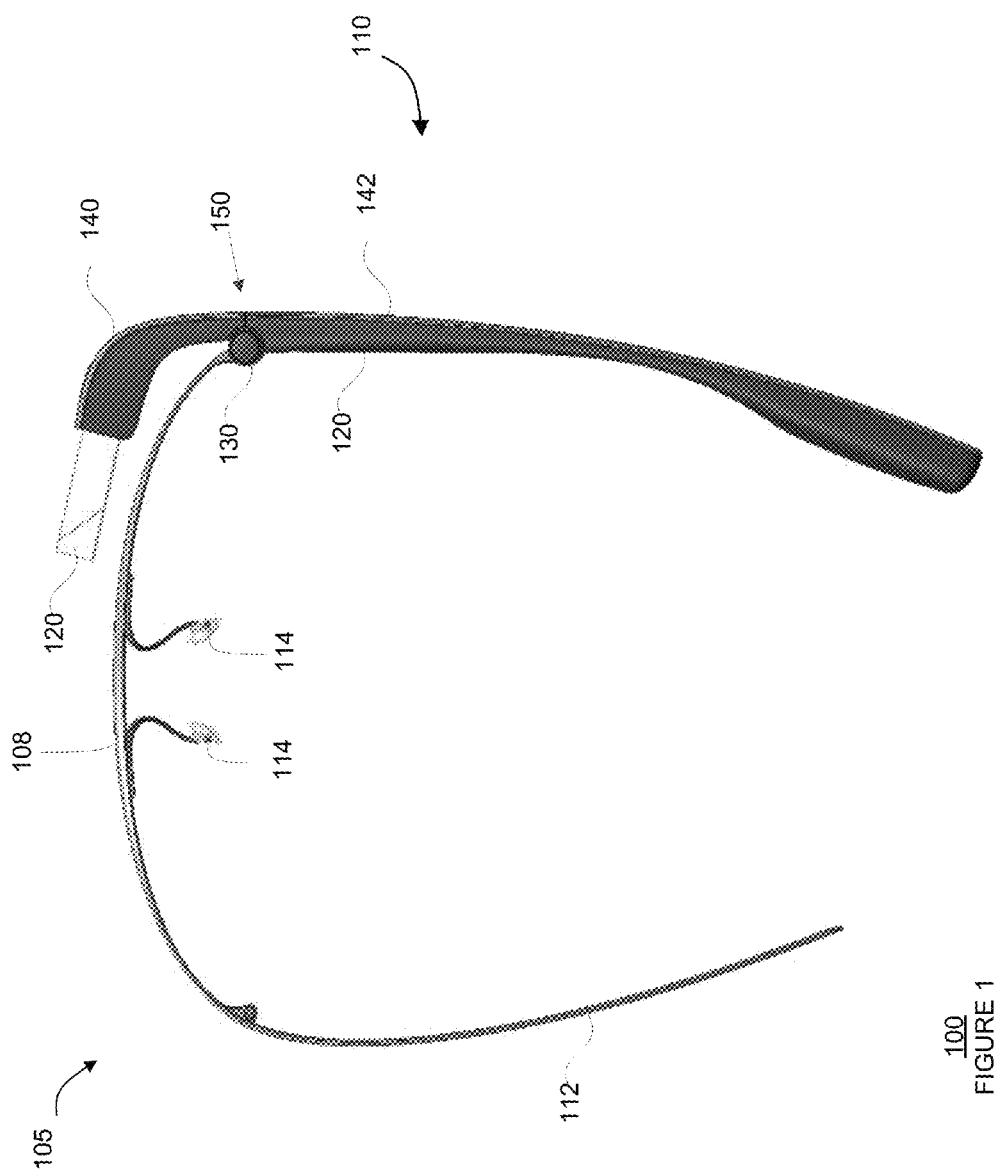
FIG. 1 is a top view of an example wearable device including a button and a hinge in accordance with aspects of the disclosure.

Aspects of the technology generally pertain to a waterproof hinge for a device, such as a head mounted device. It should be understood, however, that although discussions herein reference a head mounted device, the current technology may apply to any wearable device, such as a watch, headphones, earpiece, etc. The hinge of the head mounted device may serve as a dual-purpose sensor, which may be used to determine whether the hinge is in a first (open) position or in a second (closed) position, and therefore whether the device is to be in a first (awake) mode or a second (sleep) mode. The sensor is also used to determine whether a button, such as a button to activate an image capture feature, is unpressed, fully pressed, or partially depressed.

The hinge and button may be positioned on a first side arm of the head mounted device. The first side arm may include an outer housing that protects internal components therein. For example, the internal components may include electrical circuitry, wiring, processors, etc. which may be used to operate the device. The outer housing may be comprised of metal, plastic, or any other non-porous material that is capable of protecting the internal components from water or other liquids or other environmental damage.

The button may have internal components that should be protected from liquids as well. The internal components of the button may be protected by a housing that is comprised of a similar non-porous material as described above with respect to the outer housing of the device. Furthermore, there may be a space in between the button and the housing of the button since both pieces are distinct. Therefore, there may be a seal between the button and the housing to prevent liquid from entering the internal components of the button.

The first side arm may be comprised of two pieces, a first piece and a second piece. The first piece may be positioned adjacent to an optical display and the second piece may be adjacent to the first piece. When the hinge is in the closed position the first piece and second piece of the first side arm may separate. When the two pieces separate, each piece may have an end that is exposed. The two exposed ends of the two pieces may be protected by the outer housing of the device, which prevents liquids or other damaging particles from harming the internal components thereof as described above. In addition, a side portion of the housing of the button becomes partially exposed when the hinge is closed, but as discussed above the housing of the button is waterproof as well. Thus, the physical components of the device have been adapted to protect the internal components and circuitry from liquids and other harmful particles.

A linear hall effect sensor may be positioned adjacent to the hinge and button so as to detect movement of the magnet contained within the button-hinge assembly with respect to the sensor. The sensor may be able to detect movement of the button and hinge as a result of a magnet being attached to the button assembly. In this regard, the sensor is able to detect changing magnetic fields from the magnet moving with respect to the sensor (either rotationally when the hinge is actuated, or linearly when the button is depressed). When the button is pressed the position of the magnet with respect to the sensor changes, causing a change in the magnetic flux density observed by the sensor.

The sensor may be capable of detecting an arbitrary number of button positions based on the sensed magnetic flux density. By way of example only, the sensor can detect the difference between the button being pressed 50% of the 100% maximum depression level.

After detecting the magnetic flux density from the magnet, the sensor can transmit its measurement to a microcontroller or processor in the form of a scaled analog voltage, or as digitally coded information. The microcontroller or processor may then perform particular functions based on the information received from the sensor. Specifically, the microcontroller may assign a particular task based on the value received from the sensor. In this regard, multiple thresholds measured in gauss (i.e., the unit of measurement for magnetic flux density) may be implemented. Thus, in response to the particular interpreted value that was received and the threshold level passed, the microcontroller or processor may perform a corresponding function. For example, if the microcontroller interprets a value corresponding to the button being pressed by 50%, the processor may cause a camera of the device to provide a preview display to the user. This image may then be delivered to the graphics processing unit of the device to prepare the image for display. Additional examples that the microcontroller may perform based on the level of depression of the button are possible as well.

The same magnet that is attached to the button may also indicate to the sensor that the hinge of the device is opened or closed. For instance, when the device is open the orientation of the magnet will result in a particular magnetic field polarity being observed by the sensor. When the device is closed, however, the closed hinge causes the sensor to be oriented on a different side of the magnet, that different side causing different polarity of the magnet to be detected by the sensor. The microcontroller may react to each level of polarity that it detects differently.

Notably, magnets may slowly demagnetize over time or when exposed to certain extreme conditions. Magnetic strengths can also vary slightly between magnets of the same type. The sensor and controller system can be calibrated at assembly time, and/or periodically to accommodate for these concerns. The calibration may be done at the manufacturing facility, by a technician, or by the user through a calibration program installed on their device either manually or automatically.

FIG. 1 illustrates one example of the hinge and button configuration described above with respect to a head mounted device 105. As shown in example 100 of FIG. 1, the head mounted device 105 forms an asymmetrical U-shape that may be worn by a user. The head mounted device 105 contains a central portion 108 that extends in two opposing directions toward a first side arm 110 and a second side arm 112. The central portion also includes nose pieces 114 extending therefrom. The first and second side arms 110 and 112 and the nose pieces 114 are configured to secure the head mounted device 105 to a head of a user, for example, by extending over a first and second ear of the user and resting on a nose of the user.

The head mounted device may be comprised of a solid structure such as plastic, metal, etc., and also combinations thereof. Other materials and configurations are also possible.

Figure 2:
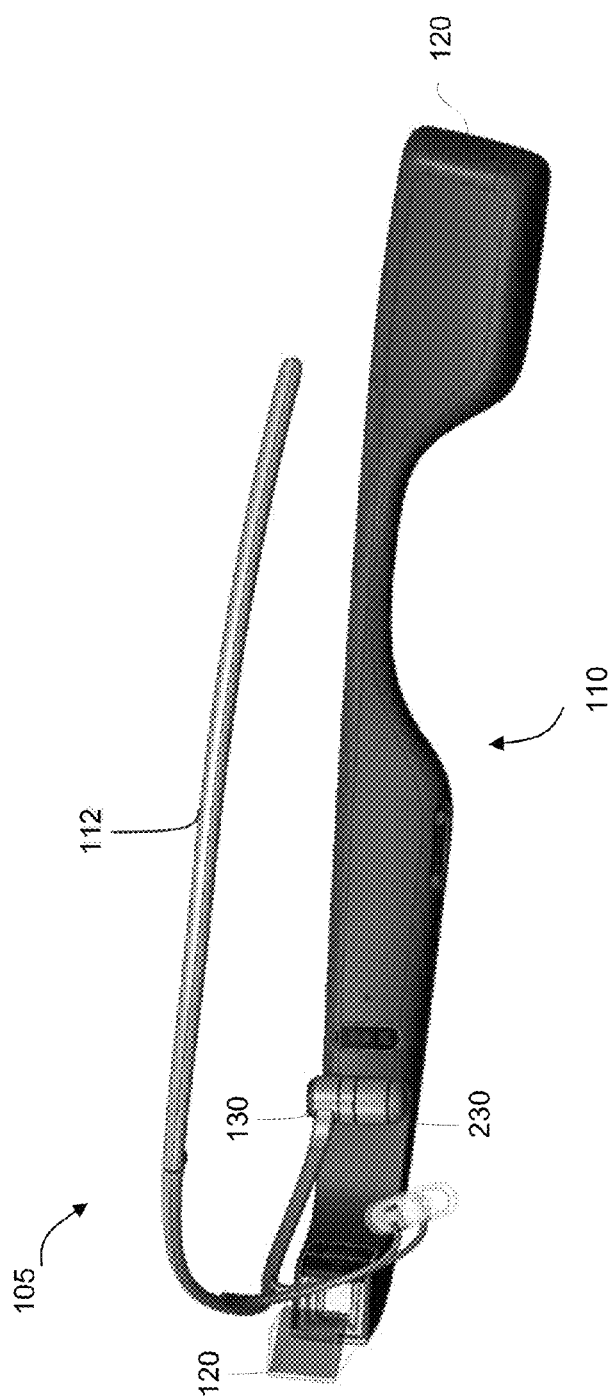
FIG. 2 is a side view of an example outer housing of the wearable device in accordance with aspects of the disclosure.

The first side arm 110 of the head mounted device 105 includes outer housing 120 to protect internal components therein. Example 200 of FIG. 2 shows a perspective view of the outer housing 120. The outer housing 120 may include, for example, electrical circuitry, wiring, processors, etc. which may be used to operate the device. In addition, the outer housing 120 may be comprised of non-porous materials so as to protect the internal components therein from damage due to water and other liquids. In this regard, the first side arm 110 of the head mounted device is waterproof.

Referring back to FIG. 1, display 120 may be formed of any material that can suitably display a projected image or graphic. The display may also be sufficiently transparent so as to allow the user to see through the display. In addition, the internal components of the first side arm may be operatively coupled to display 120. The internal components of which may operate the head mounted device; thus causing an image, graphic, menu options and other forms of text, etc. to show on display 120.

As shown in FIGS. 1 and 2, button 130 is attached to the first side arm 110 on hinge 150. Similar to the outer housing 120 described above, the button also includes a button housing 115 that protects the internal components of the button. For example, the button housing 115 may be comprised of any non-porous material in order to protect the internal components thereof. In this regard, however, at least some of the electrical components of the button have been repositioned into the first side arm to provide even more assurance that the button—and in turn the head mounted device—is waterproof. Details regarding the repositioning of the electrical components are discussed further below.

Figure 3:
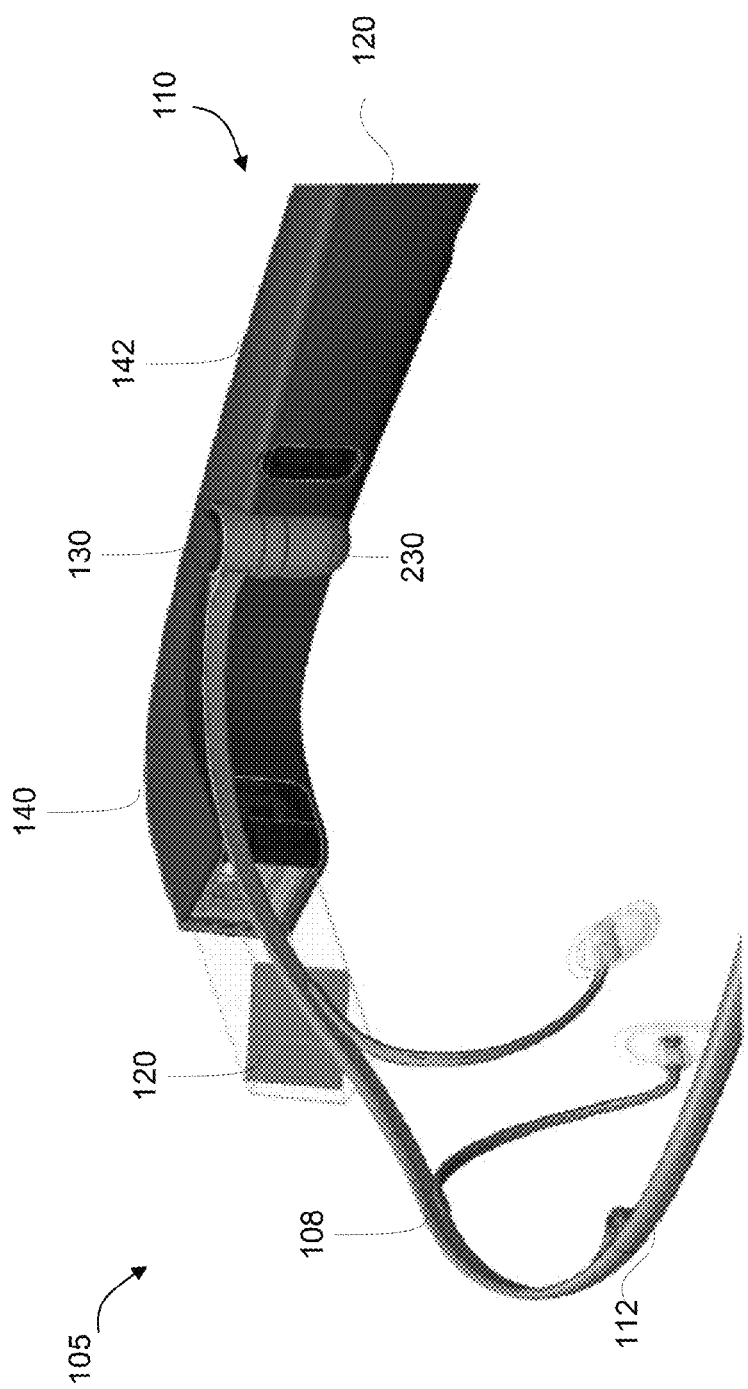
FIG. 3 is an oblique view of the button of the wearable device in accordance with aspects of the disclosure.

The button also includes a magnet attached thereto. For instance, referring to example 300 of FIG. 3, the magnet may be coupled to the button so that when the button is depressed the magnet moves in tandem with the button. Thus, the button and the magnet may be comprised of one piece of material. Alternatively, however, the button and magnet may be two separate pieces that are attached to each other. Details regarding functions of the magnet with respect to the button are explained further below.

Though not shown, in some examples there may also be a seal between the button 130 and button housing 230. For instance, the button is configured to depress in order to perform a particular function, and the button housing surrounds the button to protect the button from potential damage. Thus, because the two pieces are distinct, a seal may be implemented between the button and button housing in order to prevent water or other liquids from entering the button housing and potentially causing damage to the internal components thereof.

Figure 4:
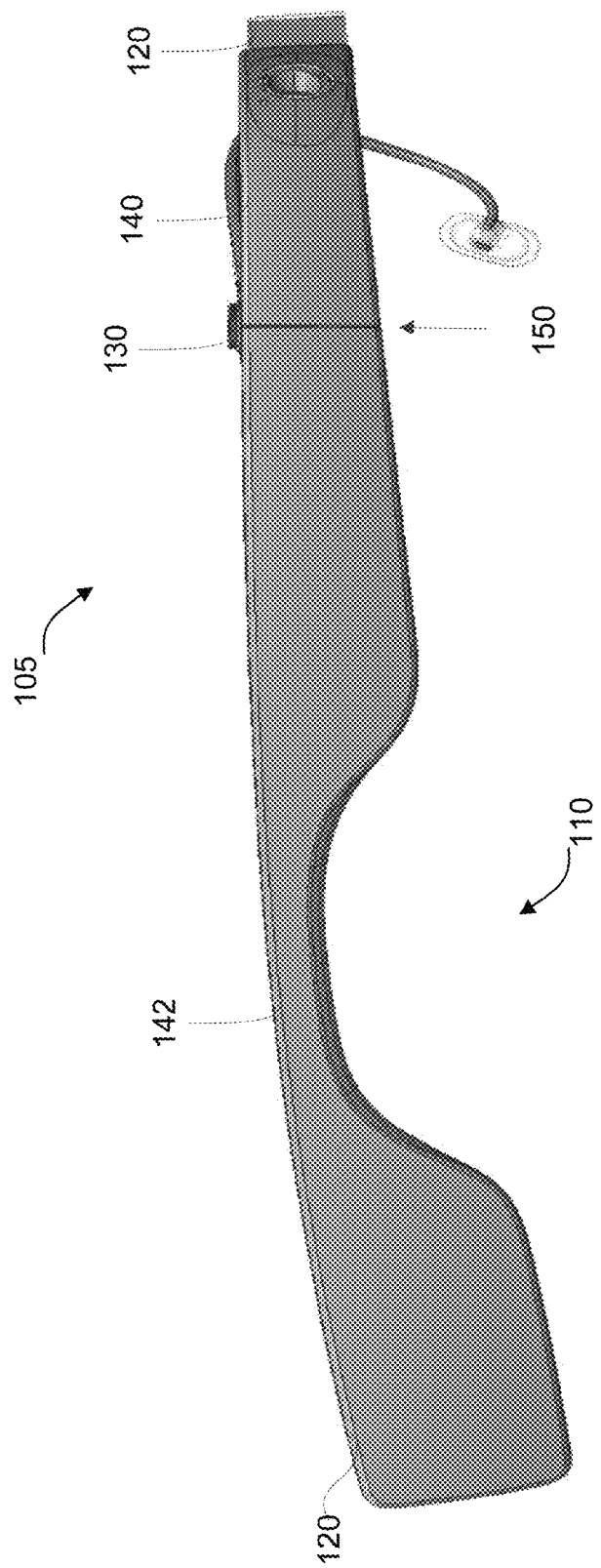
FIG. 4 is a side view of the hinge and button of the wearable device in accordance with aspects of the disclosure.
Figure 5:
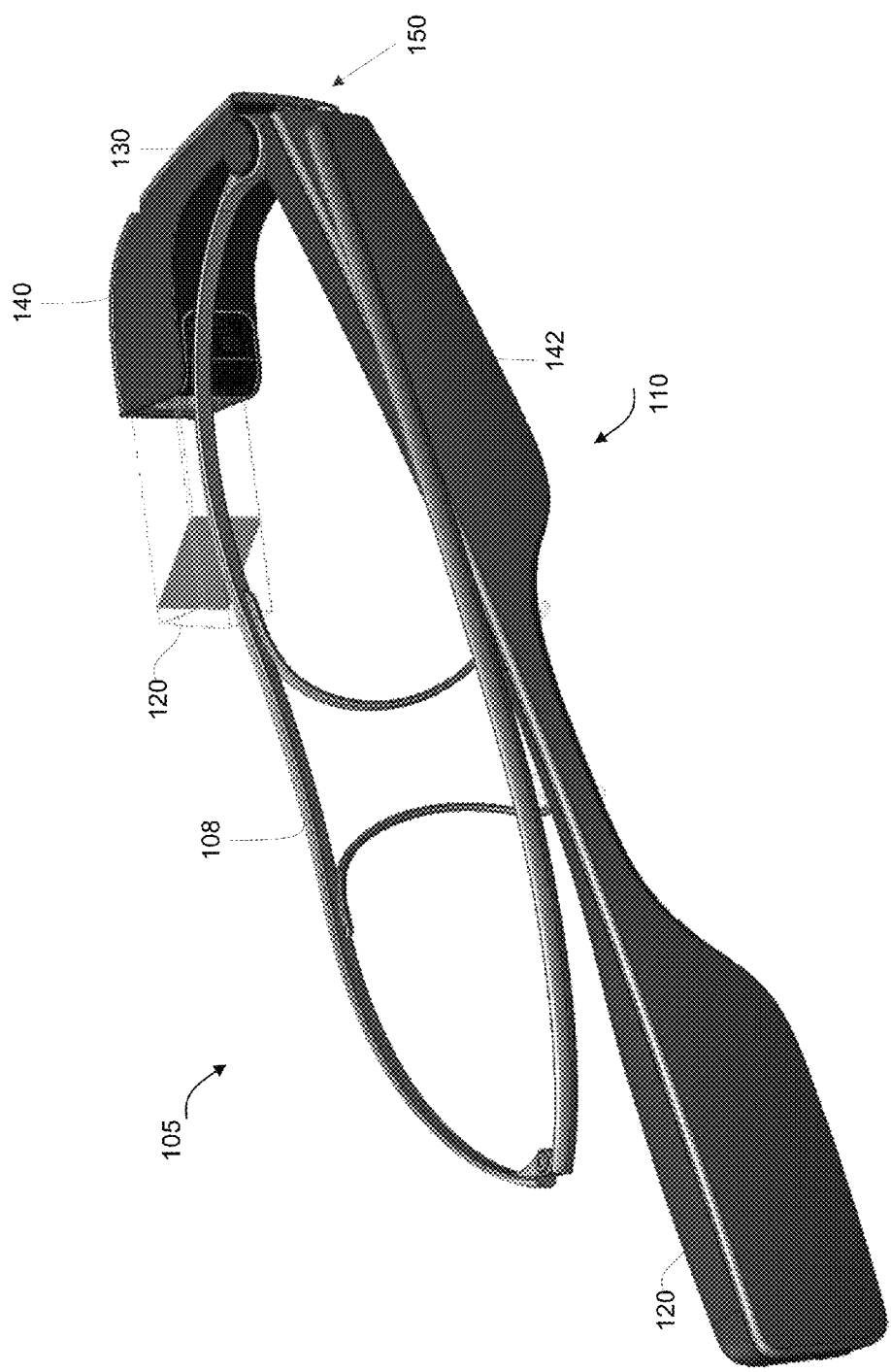
FIG. 5 is an oblique view of the hinge in a closed position in accordance with aspects of the disclosure.

Referring back to FIG. 1, the first side arm 110 may be comprised of two pieces, namely a first piece 140 and a second piece 142. The first piece 140 is adjacent to the display 120 and the second piece 142 is adjacent to the first piece 140, and the second piece is configured to extend along a temple of the user to the first ear of the user. As shown in FIGS. 1 and 4, the first and second pieces are divided by hinge 150. For instance, in examples 100 and 400 of FIGS. 1 and 4, respectively, the hinge 150 is in a first (open) position, thus allowing a user to secure the head mounted device to his or her head. On the other hand, in example 500 of FIG. 5 the head mounted device is in a second (closed) position. The closed position may expose the ends of the first and second pieces of the first side arm at hinge 150. In this regard, the ends may be comprised of non-porous, waterproof materials similar to the first side arm as described above. As one example, the material of the first piece may extend to cover the exposed end of the first piece and the material of the second piece may extend to cover the exposed end of the second piece. In this regard, the exposed ends may be formed from the same piece of continuous material of the first and second pieces. As another example, the exposed ends of the first and second pieces may be comprised of separate material that is distinct from their respective first and second pieces.

As illustrated in FIGS. 1 and 4, the hinge is positioned on the first side arm between the first piece and the second piece. The hinge allows the first piece 140 to pivot along the button housing of button 130. As shown in example 500 of FIG. 5, when the hinge is in the closed position the hinge element is configured to place the second piece 142 generally parallel to the central portion 108. When the hinge is in the open position, however, the hinge element is configured to place the second piece 142 generally perpendicular to the central portion, as shown in example 100 of FIG. 1. Advantages of implementing hinge 150 on head mounted device 105 may include, for example, easier storage and carrying for a user.

Figure 6:
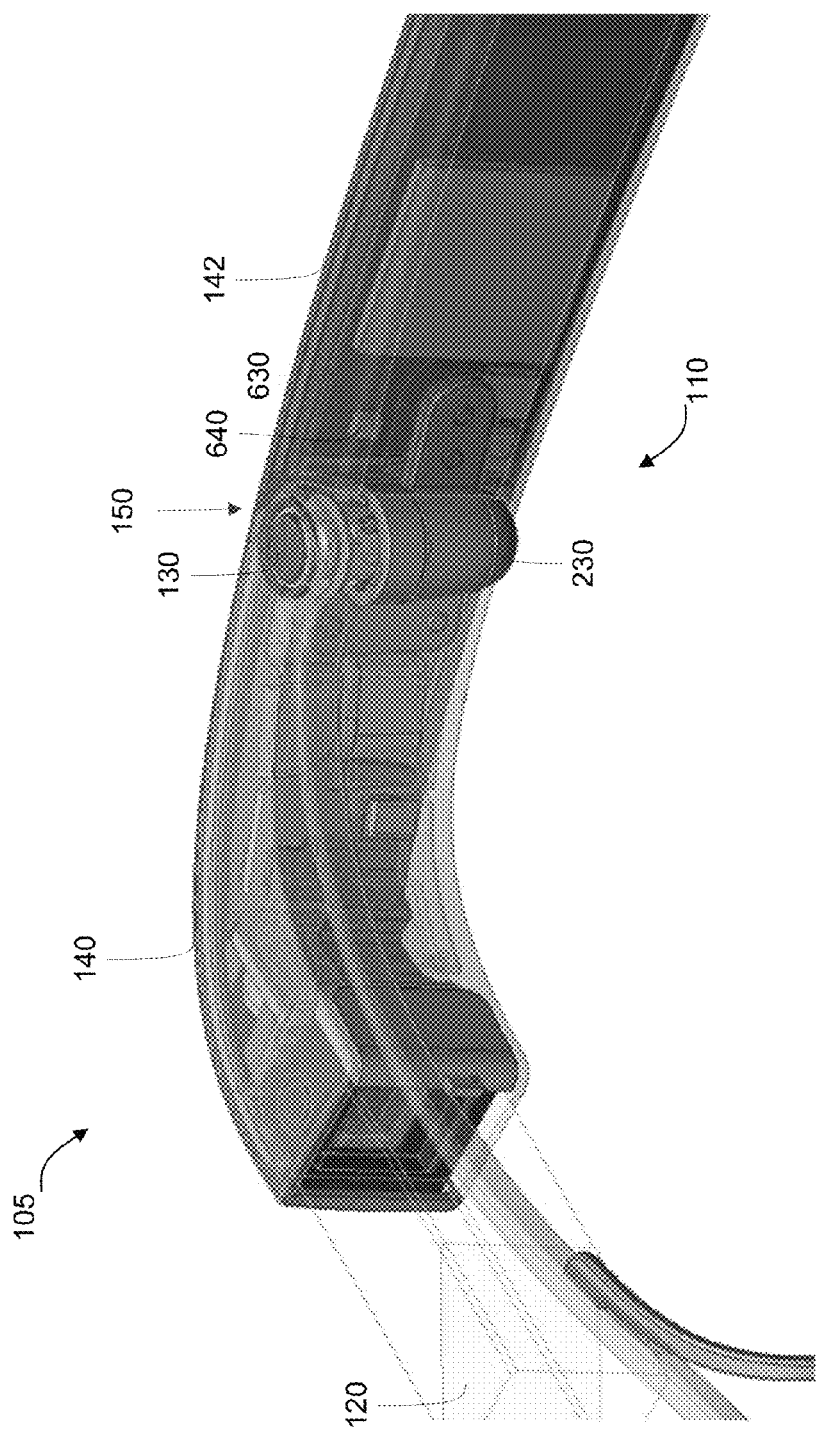
FIG. 6 is a detailed view of the various components of the head mounted device in accordance with aspects of the disclosure.

A linear hall effect sensor ("sensor") may be employed to effectuate various functions of the head mounted device. The sensor may be a linear hall effect sensor that transduces detected magnetic flux density into scaled analog voltage or as digitally coded information. For example, the sensor may measure the magnetic flux density in gauss, which is the unit of measurement for magnetic flux density. In addition, the digitally coded information may include a given value, the value corresponding to the value of the measured magnetic flux density. Referring to example 600 of FIG. 6, sensor 640 is positioned adjacent to the button and hinge components on the second piece 142 of the first side arm 110. In addition, the sensor may be placed on a Printed Circuit Board ("PCB") 630 to facilitate communication between the sensor and other electrical components within outer housing 120. As one example, a flexible PCB may be employed to accommodate placing the hinge in the desired position. Other connections among electrical components are possible as well, however, such as, in one example, typical wiring.

As mentioned above, the sensor may be capable of detecting magnetic flux density from the magnet attached to button 130. For instance, when the button 130 is depressed, such as by a given user, the magnet attached to the button emits magnetic flux density that is detectable and measurable (in gauss) by sensor 640. In this regard, the sensor is able detect movement of the button. Because the sensor is able to detect movement of the button, the electrical components of the button have been removed and placed in, as one example, the second piece of the first side arm. This allows the button to maintain the same function as if the electrical components were still located therein, but has the added benefit of making the button waterproof.

In addition, the sensor is capable of detecting multiple levels of magnetic flux density from the magnet. For instance, the button (which includes the magnet) may be fully pressed (i.e., 100%) or partially pressed (e.g., 50%, 75%, etc.) and the sensor can determine the level of depression based on the magnetic flux density that passes through the sensor.

Figure 7:
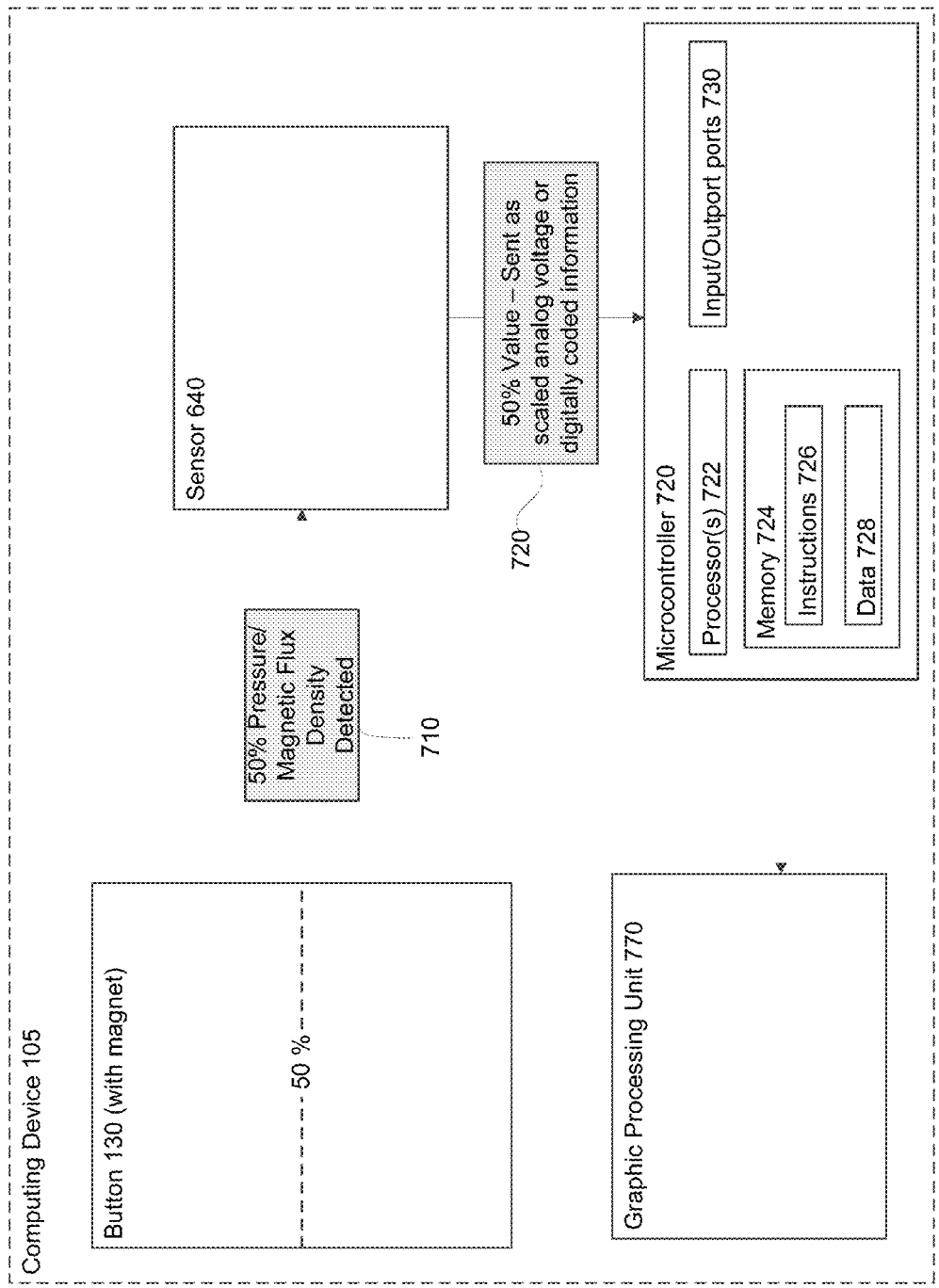
FIG. 7 is an example block diagram of an implementation of the button and sensor in accordance with aspects of the disclosure.

Example 700 of FIG. 7 is a diagram illustrating the button 130 depressed halfway (i.e., 50%). As further illustrated in FIG. 7, the sensor 640 is able to detect the 50% depression 710 of button 130. The levels of magnetic flux density detected by the sensor may include other levels of depression, for instance, any level including and between 0% depression to 100% depression.

Based on the level of depression detected by sensor 640, the sensor acts as a transducer and outputs a value that corresponds to the level of magnetic flux density measured. As one example, the sensor may output the value in the form of scaled analog voltage. As another example, the sensor may output the information in the form of digitally coded information.

Referring to example 700 of FIG. 7, the sensor 640 detected 50% magnetic flux density 710, and as a result the sensor output a value 720 of 50%. As an additional example, if the sensor detected the button was depressed 25% based on the measured magnetic flux density, then the sensor would output a value of 25%. If the sensor detected the button was depressed 100% based on the measured magnetic flux density, then the sensor would output a value of 100%. Other values of output are also possible, such as any level of output including and between 0% to 100%.

After the sensor detects a level of magnetic flux density, the sensor outputs the corresponding value to a processor. As shown in example 700 of FIG. 7, the processor may be contained in microcontroller 720, which is comprised of at least a processor, memory, data, instructions, and input/output ports. The processor(s) 722 can be any conventional processor, such as a commercially available CPU. Alternatively, the processor can be a dedicated component such as an ASIC or other hardware-based processor. In this regard, the technology herein is not limited to a microcontroller, but any processing component, including only a processor, that is capable of performing the functions described herein.

The memory 724 can include data that can be retrieved, manipulated or stored by the processor 722. The memory 724 can be of any non-transitory type capable of storing information accessible by the processor 722, such as a non-volatile memory store, memory card, ROM, RAM, DVD, CD-ROM, write-capable, and read-only memories.

The instructions 728 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 726 can be retrieved, stored or modified by the one or more processors 722 in accordance with the instructions 726. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The microcontroller (or just processor) may perform a function based on the value received from the sensor. For example, in response to the value of 50% 720 received, as shown in FIG. 7, the microcontroller 720 may display a preview image on the display of the head mounted device. In this scenario, the microcontroller may have threshold values assigned to particular functions. For instance, depending on the amount of voltage received from the sensor, the microcontroller may determine whether a threshold is satisfied, and perform a function corresponding to the highest threshold level that has been satisfied. In this regard, the microcontroller may assign magnetic profiles to each function based on the threshold value passed. For instance, if the button is 30% pressed, then the head mounted device may perform a function that corresponds to a threshold value of 25% depression, as the magnetic profile for that particular function is a value of 25%. As another example, if the button is 80% depressed then it may perform a function that corresponds to a value of 75% depression, as the magnetic profile for that particular function is a value of 75%.

Example 800 of FIG. 8 presents table 810 which illustrates other potential examples of actions the microcontroller may cause the head mounted device to perform. For instance, the microcontroller receiving 25% scaled analog voltage or digitally coded information from the sensor causes the head mounted device to initialize the graphics pipeline in the background. Initializing the graphics pipeline in the background may prepare the head mounted device for capturing or displaying an image. As an additional example, the microcontroller receiving 90% voltage from the sensor causes the camera of the head mounted device to capture a photo. Other possibilities, levels of depression, and functions of the button are possible as well. For example, the button may not operate the camera, but rather serve as a management function of the device, such as controlling items on the display of the head mounted device.

When the camera of the head mounted device is used, the captured image may be sent to the graphic processing unit 770 of the head mounted device, as shown in FIG. 7. The graphic processing unit 770 may be used, for example, to prepare the image for display to the user.

In addition to detecting magnetic flux density and outputting a value based on the button, the sensor may also serve a function for the hinge as well. For example, the sensor may, based on the same magnet attached to the button, detect an opened or closed position of the hinge. The positioning of the hinge may be done by the orientation of, and thus the magnetic field polarity ("polarity") of, the magnet with respect to the sensor. For instance, in example 900 of FIG. 9A, the magnet 920 is represented by two levels of polarity, a north pole and a south pole. The north pole 924 is depicted by the boxed design of the magnet 920, and the south pole 922 is represented by the straight line design of the magnet 920. In this scenario, when the north pole 924 of the magnet 920 is oriented toward the sensor 640, then the sensor may release a value corresponding to that level of polarity. As discussed above with respect to the detection of magnetic flux density, the sensor may also transmit the value in the form of scaled analog voltage or digitally coded information. As illustrated in FIG. 9A, when the sensor detects the north pole 924 of magnet 9200, that causes the microcontroller (or any employed processor) to determine that the hinge is in the open position. Detection of the open position may be correlated to one or more functions, such as switching modes of the head mounted device. For example, when it is detected that the hinge is open, the device may be placed in an awake mode.

In example 950 of FIG. 9B, however, the south pole 922 of magnet 920 are oriented toward the sensor 640. In this scenario, the sensor outputs a value which causes the microcontroller to determine that the hinge is in the closed position. Accordingly, the microcontroller may place the device in sleep mode.

It should be understood that the polarity detected by the sensor may include orientations where the north pole and south pole are partially facing the sensor, as opposed to fully facing the sensor as shown in FIG. 7. For example, the magnet may be showing 25% of the north pole end and 75% of the south pole end to the sensor. In this scenario, the sensor may be able to detect the level of polarity specific to that formation, transmit a corresponding value to the processor, and then the processor may perform an action based on that received value. For example, as described above the processor may determine that the received value indicates that the hinge is in the closed position. Accordingly, the head mounted device may be placed in sleep mode. As another example, if the received value indicates that the hinge is in the opened position, then the head mounted device may be perform functions that correlate to an awake mode. Furthermore, other functions may be performed by the microcontroller in addition to awaking the device or placing it in sleep mode.

Figure 10:
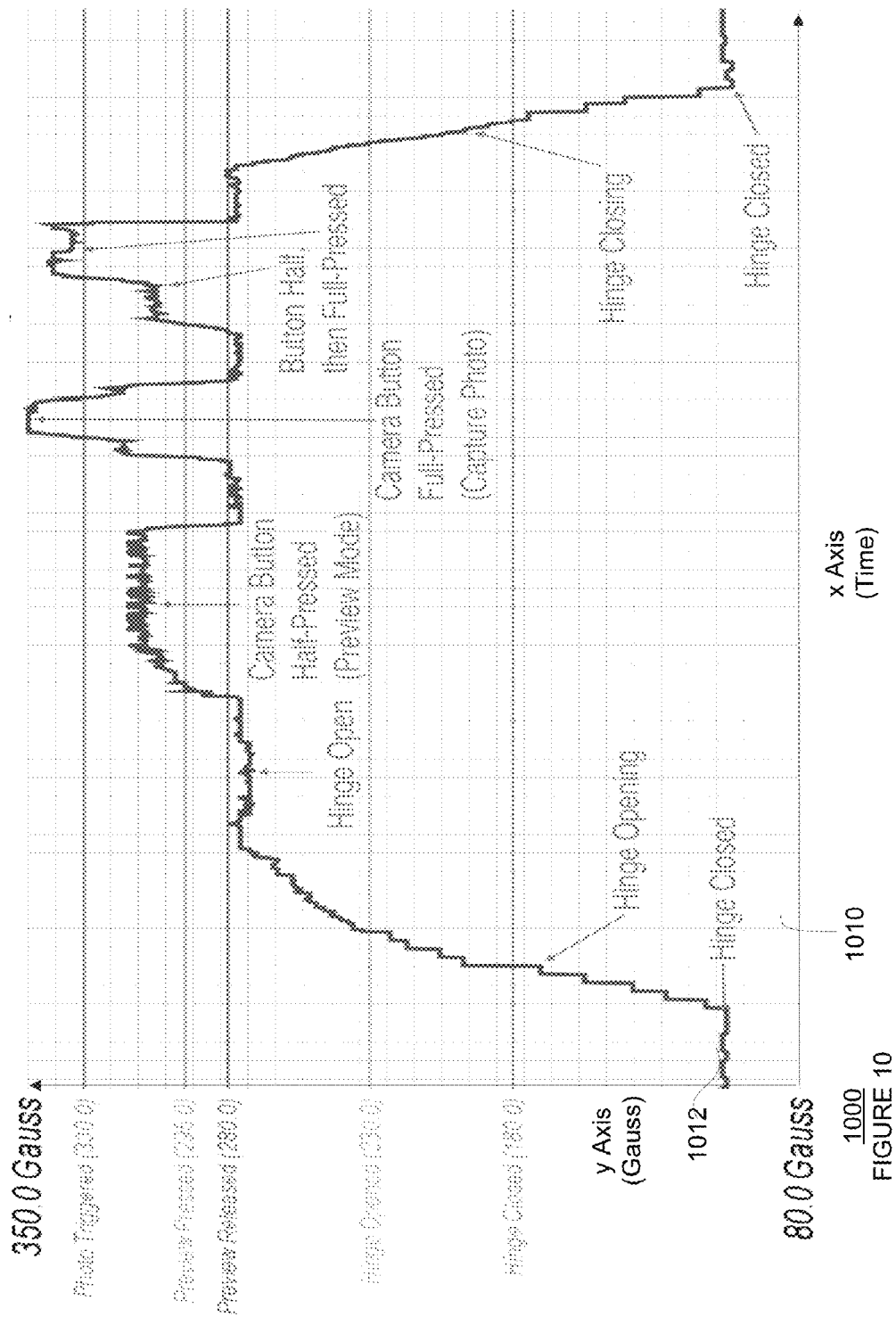
FIG. 10 is an example graph of measured values associated with operation of a sensor in accordance with aspects of the disclosure.

Example 1000 of FIG. 10 is an exemplary graph of the magnet-sensor relationship as discussed above with respect to the button and hinge. Graph 1010 shows several exemplary states being executed over a period of time, and example thresholds. The x axis of graph 1010 represents time, and the y axis represents flux density measured in Gauss ("Gs"). Graph line 1012 represents changes in flux density as different operations are performed using the head mounted device over time. As illustrated, graph line 1012 begins at the "Hinge Closed" state, where the measured Gauss of the sensor is below 180.0 Gs. As can be seen by the "Hinge Opening" text, the sensor is beginning to pick up the polarized magnetic field of the magnet as the user opens the hinge from its closed state. The more the user opens the hinge, the greater magnetic flux density the sensor detects. Accordingly, the Gauss reading increases linearly over time as opposed to an instant switch. In addition, the "Hinge Open" text illustrates the generally flat line that is detected by the sensor now that the head mounted device is in a fully open position.

Other aspects of the graph also show how the magnetic flux density of the magnet is detected by the sensor. For instance, when the user half-presses the button, that may cause the head mounted device to initiate a preview of an image currently being viewed by the camera of the head mounted device. Once the user releases the button the previewed image may be released, as illustrated by the Preview Released text on the Y axis of the graph. In addition, in response to the button being fully depressed, the head mounted device will capture an image as illustrated by the Capture Photo text in graph 1000. As can be seen, the sensor detects a high level of Gauss (at least 330.0 Gs) in order to activate the camera. In other implementations, the button may be half-pressed and then fully pressed within the same fluid motion, as illustrated by the text "Button Half, then Full-Pressed" in the graph 1010. In this regard, the user may have not released the button after the half-press, but rather previewed the image using the half-press, and then decided to capture the photo by fully pressing the button after previewing the image.

Finally, when the user closes the head mounted device, the sensor linearly detects less Gauss from the magnet. In this regard, once the Gauss detection of the sensor falls below the threshold value of 180.0 Gs, as indicated by the graph 1010, the head mounted device will perform the requisite function associated with a closed device, such as placing it in sleep mode as discussed above. Other implementations and Gauss values are possible as well. For example, Gauss values may depend on a distance between the sensor and magnet. As another example, the sensor and at least one processor may be programmed to assign different threshold values to perform particular functions. For example, instead of the Hinge Opened feature being detected at 230.0 Gs, as shown in FIG. 10, it may be assigned a value of 200.0 Gs. As another example and as discussed above, the head mounted device is not limited to employing the sensor and processors for operation of the camera, but may serve other possibilities as well. For example, the button may manage functions on the display of the head mounted device, such as selecting particular links displayed to the user.

In an additional embodiment, because the sensor requires power to operate, the microcontroller or processor may periodically turn the sensor on and off. For instance, the microcontroller may turn the sensor off so that it is only on 20 times per second. Alternatively, the microcontroller may keep the sensor on for fractions of a second every second. This allows the head mounted device to save power, but still allows for the detection of any actions performed on the device because the device is still turned on frequently enough to detect actions.

Furthermore, the amount of time the sensor is turned off may vary based on the current status of the device. For example, if the microcontroller determined that the hinge of the head mounted device is closed, then the microcontroller may turn off the sensor for longer periods of time than if the hinge was in the opened position. For instance, in the opened position the microcontroller may keep the sensor on for 20 milliseconds per second, and if the hinge is in the closed position then the microcontroller may keep the sensor on for 5 milliseconds per second. When the device is closed, there is less need for the sensor to detect user actions, and once the hinge is switched into the open position, 5 milliseconds per second is more than enough time to detect the opening of the hinge and then to react. In addition, a user waiting for fractions of a second for the head mounted device to turn on (e.g., wake-up) is not burdensome and likely unnoticeable by the user.

The magnet should also be calibrated to effectively operate with the head mounted device. For example, the magnet may need to be calibrated so the sensor and microcontroller learn what levels of magnetic flux density are emitted based on the particular action. Since magnets may not be identical and their strengths can slightly vary among one another, performing calibration for the particular device may help the above features function more accurately. Magnetic strength can demagnetize over time or as a result of extreme conditions (such as heat), and the positioning of the magnet may change over time as well. Thus, re-calibrating the head mounted device periodically may also aid in the accuracy and functionality of the above described features to counter the potential issues associated with magnets. Calibration may be done as part of an initial factory setting, by a technician when the user purchases the device, or by the user through a calibration program that is installed on the head mounted device, which may be done manually or automatically.

As another embodiment, the head mounted device may employ multiple linear hall effect sensors to detect multiple threshold levels of magnetism. For instance, the above disclosure discusses a sensor that has adjustable thresholds for detecting magnetism. However, the head mounted device may also employ multiple sensors, each sensor being assigned to its own threshold level. Once the threshold level is satisfied, that particular sensor relays a corresponding value to the microcontroller or processor.

The subject matter described herein is advantageous in that it provides for a waterproof button and hinge configuration, while maintaining the functions and performance of the device. In this regard, the head mounted device maintains the functionality of not only implementing a button, but a button with multiple threshold levels to perform different functions. The hinge is able to pivot around the button to make the head mounted device more user friendly in terms of storage and transportation, while maintaining the added benefit of a waterproof device. In addition, these beneficial features are employed while still maintaining, and even enhancing, the aesthetic appeal of the head mounted device.

As these and other variations and combinations of the features discussed above can be utilized without departing from the subject matter as defined by the claims, the foregoing description of embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus comprising:
    a side arm having a first end coupled to a first end of a central support;
    a hinge positioned between the first end of the side arm and the first end of the central support, the hinge adapted to act as a pivot point in moving the side arm with respect to the central support;
    a button positioned on the hinge;
    a magnet positioned within the hinge in relation to the button; and
    a sensor adjacent the button, wherein the sensor is configured to detect at least one of magnetic field polarity and magnetic flux density from the magnet.

2. The apparatus of claim 1, wherein an outer housing of the side arm is comprised of non-porous material.

3. The apparatus of claim 1, wherein electrical circuitry of the button is disposed within the side arm.

4. The apparatus of claim 1, wherein the sensor is located on an exterior of the side arm.

5. The apparatus of claim 1, wherein the sensor is positioned in a first orientation with respect to the magnet when the hinge is in an open position.

6. The apparatus of claim 1, wherein the sensor is positioned in a second orientation with respect to the magnet when the hinge is in a closed position.

7. The apparatus of claim 1, wherein the button is at least partially encapsulated in a button housing, and the button housing is configured to protect internal components of the button from damage.

8. The apparatus of claim 1, wherein the button is moving among a plurality of positions, the plurality of positions at least including being fully pressed, half-pressed, and not pressed.

9. The apparatus of claim 8, wherein the magnet is configured to move with the movement of the button.

10. A method comprising:
    measuring, using a sensor coupled to at least one processor, at least one of magnetic field polarity and magnetic flux density of a magnet coupled to a button;
    generating, using the at least one processor, a value based on the measurement, wherein the value indicates the position of the sensor with respect to the magnet;
    determining whether the value satisfies one of a plurality of threshold levels, each threshold level being associated with a different function; and
    performing the function associated with the highest satisfied threshold level.

11. The method of claim 10, further comprising determining, based on the value, a position of the button.

12. The method of claim 11, wherein the position corresponds to a level of depression of the button.

13. The method of claim 12, wherein the function includes at least one of capturing an image using a camera, previewing an image using the camera, and initializing operation of the camera.

14. The method of claim 10, wherein the function includes at least one of waking-up an electronic device or placing the electronic device in a sleep-mode.

15. The method of claim 10, further comprising powering off the sensor for periods of time.

16. A system comprising:
    a sensor;
    one or more processors in communication with the sensor;
    memory coupled to the one or more processors;
    wherein the one or more processors are configured to:
    receive from the sensor a measurement of at least one of magnetic field polarity and magnetic flux density of a magnet coupled to a button, the magnet moving in tandem with the button;
    generate a value based on the measurement, wherein the value indicates the position of the sensor with respect to the magnet;
    determine whether the value satisfies one of a plurality of threshold levels, each threshold level being associated with a different function; and
    perform the function associated with the highest satisfied threshold level.

17. The system of claim 16, wherein the one or more processors are further configured to determine, based on the value, a position of the button.

18. The system of claim 17, wherein the position corresponds to a level of depression of the button.

19. The system of claim 18, wherein the function includes at least one of capturing an image using a camera, previewing an image using the camera, and initializing operation of the camera.

20. The system of claim 16, wherein the function includes at least one of waking-up an electronic device or placing the electronic device in a sleep-mode.

* * * * *